(12) United States Patent
Jain et al.

(10) Patent No.: US 9,049,034 B2
(45) Date of Patent: Jun. 2, 2015

(54) MULTICAST FLOW MONITORING

(75) Inventors: Manoj Kumar Jain, Bangalore (IN); Sanjay Kumar, Bangalore (IN); Sumit Kumar, Bangalore (IN); Lokesh Chenta, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1030 days.

(21) Appl. No.: 13/019,310

(22) Filed: Feb. 2, 2011

(65) Prior Publication Data

US 2012/0155277 A1 Jun. 21, 2012

(30) Foreign Application Priority Data

Dec. 20, 2010 (IN) .......................... 3877/CHE/2010

(51) Int. Cl.
*G01R 31/08* (2006.01)
*H04L 12/18* (2006.01)
*H04L 12/26* (2006.01)

(52) U.S. Cl.
CPC ........... *H04L 12/1863* (2013.01); *H04L 43/026* (2013.01)

(58) Field of Classification Search
CPC ... H04L 12/1863; H04L 43/026; H04L 45/00; H04L 45/04; H04L 65/4076
See application file for complete search history.

(56) References Cited

U.S. PATENT DOCUMENTS

| | | | |
|---|---|---|---|
| 6,597,777 B1 * | 7/2003 | Ho .................. | 379/133 |
| 6,651,099 B1 * | 11/2003 | Dietz et al. ....... | 709/224 |
| 6,717,917 B1 * | 4/2004 | Weissberger et al. ........ | 370/252 |
| 7,924,739 B2 * | 4/2011 | Sen et al. ....... | 370/253 |
| 2002/0059078 A1 * | 5/2002 | Valdes et al. ....... | 705/1 |
| 2005/0129017 A1 * | 6/2005 | Guingo et al. ....... | 370/390 |
| 2006/0146703 A1 * | 7/2006 | Cha et al. ....... | 370/229 |
| 2007/0266148 A1 * | 11/2007 | Ruiz et al. ....... | 709/224 |
| 2009/0112651 A1 * | 4/2009 | Atkinson ......... | 705/7 |
| 2009/0180391 A1 * | 7/2009 | Petersen et al. ....... | 370/252 |
| 2009/0245109 A1 * | 10/2009 | Hurley et al. ....... | 370/235 |
| 2009/0290491 A1 * | 11/2009 | Karagiannis et al. ........ | 370/235 |
| 2011/0255421 A1 * | 10/2011 | Shrirang et al. ....... | 370/244 |
| 2013/0298149 A1 * | 11/2013 | Tidwell et al. ....... | 725/13 |

* cited by examiner

*Primary Examiner* — David Oveissi
(74) *Attorney, Agent, or Firm* — Hewlett-Packard Patent Department

(57) ABSTRACT

Provided is a method of monitoring a multicast flow. An initial multicast flow is characterized as a baseline flow entity. A subsequent multicast flow is compared against the baseline flow entity to identify anomalies between the baseline flow entity and the subsequent multicast flow.

17 Claims, 3 Drawing Sheets

MULTICAST FLOW MONITORING

RELATED APPLICATION

Benefit is claimed under 35 U.S.C. 119(a)-(d) to Foreign application Serial No. 3877/CHE/2010, filed in INDIA entitled "MULTICAST FLOW MONITORING" by Hewlett-Packard Development Company, L.P., filed on Dec. 20, 2010, which is herein incorporated in its entirety by reference for all purposes.

BACKGROUND

Computers have become pervasive both in human communication and interaction. Supported by increased bandwidth speed and network availability, computers have acquired a key position even in the entertainment space, previously dominated by television sets and radios. So much so that enterprises are increasingly looking at novel and efficient ways of providing various engaging solutions, be it in knowledge domain, entertainment or otherwise, to its millions of present and potential customers. One such technology which is being increasingly favored, for its efficiency to provide rich content over a network, is the multicast technology.

Multicast is an efficient mechanism for transmitting data from a single source (for example, a server) to multiple receivers (for example, personal computers) on a network. Multicast packets are replicated down appropriate paths in a network to create the most efficient routing mechanism possible. The sender is required to send a data packet only once, even if the packet needs to be delivered to multiple receivers.

Multicast is used for mass distribution of streaming media. Some applications where multicast has been used include: IPTV, gaming, Audio Video conferencing, distance learning, stock tickers, etc. Multicast technology helps in saving bandwidth and processing power.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
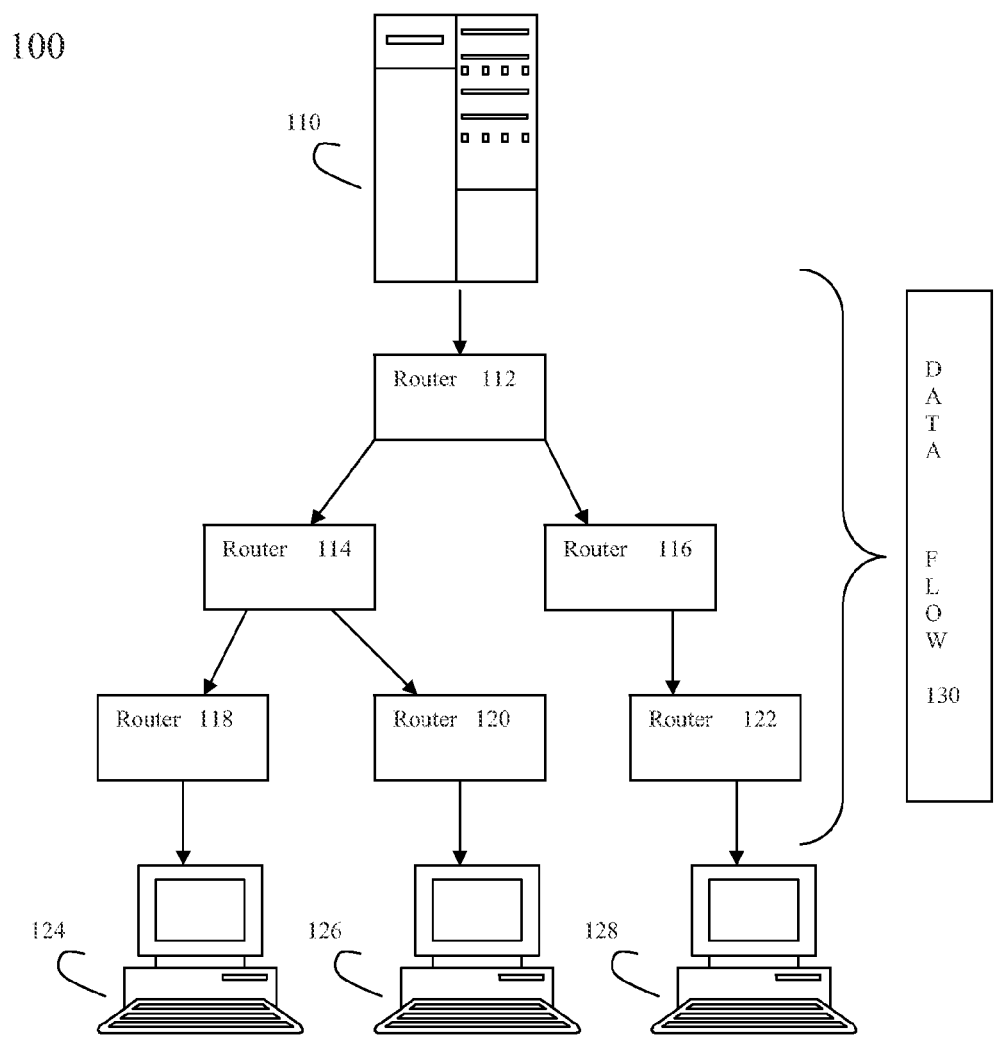
FIG. 1 is a schematic block diagram of a multicast system according to an embodiment.

As mentioned earlier, multicast technology is being increasingly favored by organizations to send data (especially, multimedia content) over a network. The technology is being widely employed in stock exchanges, businesses involved in multimedia content delivery, dissemination of financial information etc. However, with increased usage and deployment of multicast applications in a business environment, enterprises may need the capability to manage multicast applications along with the rest of their infrastructure. If a multicast application is central to the success of a business, it becomes all the more significant to continuously monitor multicast traffic and ensure that multicast traffic is meeting a Service Level Agreement (SLA) and reaching all intended subscribers with a desired quality of service (QoS).

Multicast packets are forwarded through a network by using a distribution tree. The network replicates a data packet at each node (for example, routers or switches) of the network so that data (or messages) is sent over each node (link) of the network only once. When a receiver joins a multicast group, a multicast distribution tree is constructed for that group. Once a data packet is sent by a sender to a multicast group, it reaches all receivers who have joined the group. Also, the multicast distribution does not require a source to know about the receivers who have joined a multicast group. This makes the mechanism (distribution) extremely efficient in sharing the same information amongst many receivers, thereby improving network utilization in a cost effective way.

However, as mentioned earlier, deployment of a multicast application may also require that multicast traffic is monitored in an effective way so as to ensure a SLA compliance and a desired quality of service (QoS). Any variation in distribution tree topology or multicast data flow rate should be detected and managed proactively. Consequently, a multicast monitoring solution should monitor whole or part of such distribution tree. To monitor such distribution tree, a user should be completely aware of multicast flow topology and manually configure the distribution tree topology for monitoring. As number of multicast flow increases, the configuration of such flows for monitoring becomes a difficult and complex task.

In this regard, it may also be mentioned that the underlying assumption of a multicast monitoring is targeted around multicast traffic whose behavior may be well defined. For example, IPTV channel will have active flow through out the day. Stock ticks will be active only during business hours and may have "Follow the SUN" characteristics.

Proposed is a solution that mitigates the prior art limitations of monitoring a multicast flow. Embodiments of the present solution provide a method and a system for monitoring a multicast flow.

For the sake of clarity, it is defined that a "multicast flow" refers to a flow of data in a multicast environment (network). The type of data may include, but is not limited to, text, audio, video, multimedia, etc.

FIG. 1 is a schematic block diagram of a multicast system according to an embodiment.

The multicast system 100 includes a multicast content server 110, routers/switches 112, 114, 116, 118, 120, 122 and user computer systems or receivers 124, 126, 128.

The multicast content server 110 is connected to routers/switches 112, 114, 116, 118, 120, 122 and user computer systems or receivers 124, 126, 128 through a network, which may be wired or wireless. The network may be a public network, such as, the Internet, or a private network, such as, an intranet. The number and type of routers/switches 112, 114, 116, 118, 120, 122 and user computer systems 124, 126, 128 connected to multicast content server 110 is for the purpose of illustration only. The system 100 may include any number of routers/switches and user computer systems, including multiple number of multicast content servers.

The multicast content server 110 hosts the content which may be shared with user computer systems 124, 126, 128. It is connected to the user computer systems 124, 126, 128 through routers/switches 112, 114, 116, 118, 120, 122. The multicast content server transmits multicast data flow to user computer systems 124, 126, 128 through routers/switches 112, 114, 116, 118, 120, 122. The content on the multicast server 110 may include, but not limited to, data, audio, video, multimedia, etc.

The user computer systems or receivers 124, 126, 128 may be any kind of computing device, such as, but not limited to, a personal computer, a desktop computer, a laptop computer, a notebook computer, a network computer, a personal digital assistant (PDA), a mobile device, a hand-held device, a television set, a radio, or any other suitable electronic device.

The routers 112, 114, 116, 118, 120, 122 may be, but not limited to, an edge router, a subscriber edge router or a core router. They transfer multicast data from a multicast server to end user computer systems or devices.

In an embodiment, the multicast system 100 may work as follows. The multicast content server 112 sends multicast content to router 112. The router 112 in turn routes the content to routers 114, 116. Routers 114 and 116 forward the content to routers 118, 120, 122, who in turn pass on the content to their respective user computer systems 124, 126 and 128. For example, the content received by user systems 124 and 126, may vary from the content received by user computer system 128. Multicast technology allows only authentic user computer systems, who have subscribed to a particular content data flow of a content server, to receive the content. User systems signify their willingness to receive a particular data from a content server by joining a particular multicast group. Once the user systems join a particular group, a multicast distribution tree is created for that group.

The flow of data from the content server 112 to user computer systems 124, 126, 128 may be managed by a multicast protocol. Some of the most common protocols used to manage flow of data in a multicast system, such as that of FIG. 1, may include, but not limited to, Internet Group Management Protocol (IGMP), Protocol Independent Multicast PIM, Distance Vector Multicast Routing Protocol (DVMRP), User Datagram Protocol (UDP), and Pragmatic General Multicast (PGM).

FIG. 1 also illustrates in a schematic way the "data flow" from multicast content server 110 to user computer systems 124, 126, 128 through routers/switches 112, 114, 116, 118, 120, 122. "Data flow" represents the flow of content/data within the multicast system 100.

Figure 2:
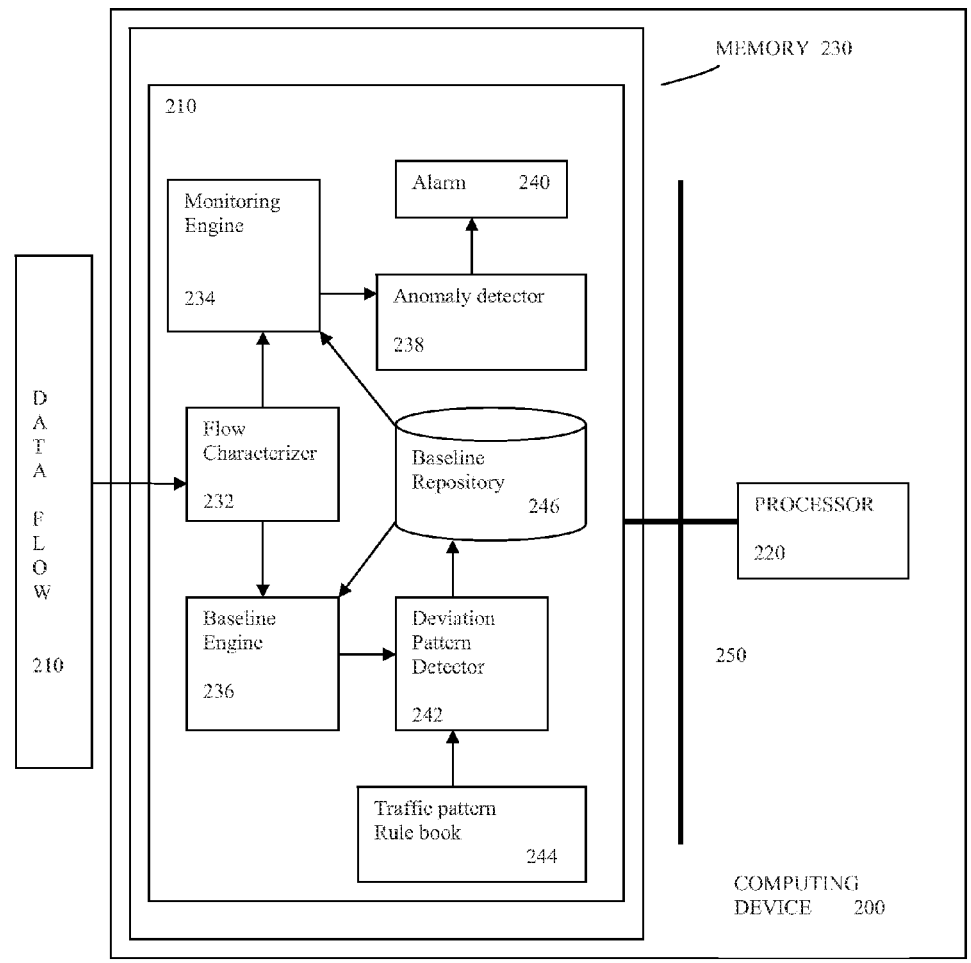
FIG. 2 is a schematic block diagram of a multicast flow monitoring system on a computing device according to an embodiment.

FIG. 2 is a schematic block diagram of a multicast flow monitoring system on a computing device according to an embodiment.

In an embodiment, the multicast flow monitoring system 210 may be hosted on a computing device 200, such a computer server. The computer server may be, but not limited to, a multicast content server 110 of FIG. 1. In an alternate embodiment, the multicast flow monitoring system may be hosted on a router/switch of a multicast system or any other computer network. For example, the multicast flow monitoring system may be hosted on any of the routers depicted in FIG. 1. In a still another embodiment, the multicast flow monitoring system may be hosted on multiple devices. For example, the system may be hosted partially on one device and the rest on another device(s).

The multicast flow monitoring system 210 may be implemented in the form of software module(s), hardware or a combination of hardware and software components. The multicast flow monitoring system 210 may communicate with other computing system or devices through wired or wireless means. The computing device may include a processor 220 and a memory 230. These components may be coupled together through a system bus 250.

The processor 220 is used to execute machine readable instructions. In an embodiment, the machine readable instructions may comprise, inter alia, instructions to characterize an initial multicast flow as a baseline flow entity, and compare a subsequent multicast flow entity against the baseline flow entity to identify anomalies or differences between the baseline flow entity and the subsequent multicast flow.

The memory 230 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The multicast flow monitoring system 210 may be stored in the memory 230.

In an embodiment, memory 230 may store various modules for implementing the multicast flow monitoring system. These modules communicate with each other to exchange data.

The memory 230 may include a flow characterizer module, a monitoring engine module 234, a baseline engine module 236, an anomaly detector module 238, a deviation pattern detector module 242, a traffic pattern rule book repository 244 and a baseline repository 246. In an embodiment, the aforementioned modules may constitute a computer program product or application, which may function as a standalone application or form part of another application.

The term "module", as used herein, means, but is not limited to, a software or hardware component. A module may include, by way of example, components, such as software components, processes, functions, attributes, procedures, drivers, firmware, data, databases, and data structures. The module may reside on a volatile or non-volatile storage medium and configured to interact with a processor of a computer system.

The flow characterizer module 232 is responsible for capturing a multicast distribution tree topology along with flow attributes. Some examples of the multicast distribution tree topology include: source tree topology and shared tree topology. The flow attributes may include, for example, multicast address range supported, multicast port range supported, multicast flow rate per channel, source node, rendezvous point etc.

The monitoring engine module 234 compares a current flow entity against an active baseline flow entity and discovers the change in flow topology or flow attributes. The current flow entity includes the data flow that is presently passing thorough a multicast system or network. The baseline flow entity refers to a historical or reference data flow through the multicast system.

For the sake of clarity, the term "entity" has been used to characterize and refer to a flow of data in a multicast system or network. For example, a "current flow entity" refers to a flow of data in a multicast system, at a given or present time.

The anomaly detector 238 evaluates if a deviation in flow topology or flow attributes is undesirable and generates alarm 240 for root cause analysis.

Baseline engine 236 is responsible for comparing a current flow entity against an active baseline flow entity to discover a deviation pattern. An "active" baseline flow entity refers to one of the historical or reference data flows through the multicast system that is presently being employed as a baseline parameter for comparison against a current flow entity.

Deviation Pattern detector 242 is responsible for discovering the deviation pattern. A deviation pattern includes a deviation between a baseline flow entity and a current flow entity. A deviation pattern is evaluated for conformity against a set of known patterns, which are stored in the traffic pattern rule book 244. The rule book 224 stores rules that define a pattern(s).

Baseline repository 246 stores the baseline flow entities with timestamp. The multicast flow monitoring system 210 stores a baseline flow entity for each time or period of a day in the baseline repository. For example, a baseline flow entity may be created for 12:00 PM i.e. a data flow in the multicast flow monitoring system 210 may be captured for 12:00 PM and stored as the baseline entity for 12:00 PM (timestamp). The baseline repository 246 provides the active baseline for a particular time of a day.

FIG. 2 also illustrates in a schematic way a sample "data flow" 210 from a multicast system or network to a multicast flow monitoring system on a computing device.

It would be appreciated that the system components depicted in FIG. 2 are for the purpose of illustration only and the actual components may vary depending on the computing system and architecture deployed for implementation of the present solution. The various components described above may be hosted on a single computing device or multiple computer systems, including multiple servers, connected together through suitable means.

The operation of each module constituting the multicast flow monitoring system will now be described in detail with reference to flowchart shown in FIG. 3.

Figure 3:
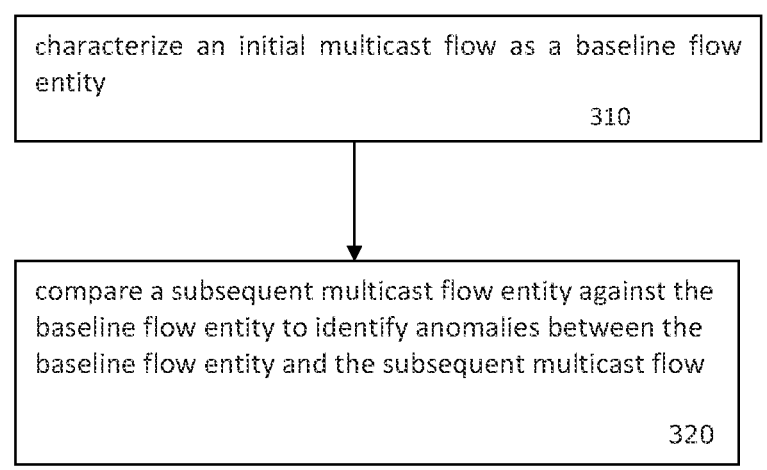
FIG. 3 shows a flow chart of a computer-implemented method for monitoring multicast flow according to an embodiment.

FIG. 3 shows a flow chart of a computer-implemented method for monitoring multicast flow according to an embodiment.

In step 310, an initial multicast flow is characterized as a baseline flow entity. The flow characterizer 232 may be used to capture a multicast distribution tree topology or data flow. The characterization of an initial multicast flow as a baseline flow entity may be based on at least one parameter. For example, the characterization of an initial multicast flow as a baseline flow entity may be based on a time of a day. In another example, the characterization may be based on a set of routers participating in the multicast flow (This is an example of topology characterization). The characterization can be further refined based on participating router with some of the key flow attributes, for example, flow rate and the time of the day. This characterization may be defined in traffic pattern rule book.

A multicast flow in a multicast system or network is monitored (for example, by monitoring engine 234) and at least one sample of flow topology is taken at a scheduled polling time. The sample constitutes the baseline flow entity with a timestamp for the time the sample was taken. The baseline flow entity with the timestamp is stored in the baseline repository 246. The characterization of an initial multicast flow as a baseline flow entity, based on a time of a day, may be carried at multiples times of the day thereby generating multiple characterizations, with each characterization corresponding to a particular time of the day. In other words, multiple samples may be taken at different times of the day, and each corresponding baseline flow entity is stored with its timestamp in the baseline repository 246.

In step 320, a subsequent or later multicast flow entity is compared (for example, by the baseline engine 236) against the baseline flow entity to identify anomalies or differences between the baseline flow entity and the subsequent multicast flow. A current sample of data flow in a multicast system (current flow entity) is taken against a previously captured baseline flow entity to identify differences between the baseline flow entity and the subsequent (or current) multicast flow entity. For example, a sample multicast flow entity captured at 12:00 PM of a day may be compared against a baseline flow created earlier for 12:00 PM. The baseline flow entity for 12:00 PM may be extracted for comparison from the baseline repository 246.

In an embodiment, if upon comparison the differences between the baseline flow entity and the subsequent (or current) multicast flow entity are undesirable, an alarm 240 may be generated by the anomaly detector 238. For example, if the changes in flow topology or flow attributes between the baseline flow entity and the subsequent (or current) multicast flow entity are undesirable, the anomaly detector 238 may crate an alarm.

In another embodiment, a subsequent (or current) multicast flow is compared against the baseline flow entity to identify and create a pattern of deviation. Each comparison between a subsequent multicast flow entity and a baseline flow entity may create a pattern of deviation, thereby creating multiple patterns of deviation. These patterns of deviation are defined as set of rules in a rule book repository 244.

If upon comparison a baseline flow entity and a subsequent (or current) multicast flow entity, a pattern of deviation is detected (for example, by the deviation pattern detector 242), and if the pattern of deviation matches to any of the rules in the rule book, the current flow entity is selected as the new baseline entity, for the time of the day the comparison was made, and added (or updated) in the baseline repository (246) for a future comparison. From this point onwards, the new baseline entity becomes the active baseline. The process is continued to configure the baseline according to the multicast flow pattern.

In an example, an initial multicast flow and a subsequent flow may just be samples of the original data flow in a multicast system.

The embodiments described provide an effective mechanism to monitor a multicast flow. The embodiments simplify the configuration of a multicast flow monitoring and automatically reconfigure a multicast system based on simple user configuration rules. The embodiments detect the changes in flow pattern and adapts to changes by applying a new baseline, thereby reducing the chances of generating false alarms.

It will be appreciated that the embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A computer-implemented method of monitoring a multicast flow comprising:
   receiving, at a device in a network, first multicast packets of a multicast flow in a distribution tree;
   determining attributes for the first multicast packets of the multicast flow;

characterizing the first multicast packets of the multicast flow as a baseline flow entity based on the determined attributes for the first multicast packets of the multicast flow;

receiving, at the device, second multicast packets of the multicast flow in the distribution tree;

determining attributes for the second multicast packets of the multicast flow;

characterizing the second multicast packets of the multicast flow as a current flow entity; and comparing the attributes determined for the second multicast packets in the current flow entity against the attributes for the first multicast packets in the baseline flow entity to identify anomalies between the baseline flow entity and the current flow entity.

2. A method of claim 1, wherein characterizing the first multicast packets of the multicast flow as the baseline flow entity is based on a time of a day.

3. A method of claim 1, wherein characterizing the first multicast packets of the multicast flow as the baseline flow entity is based on a particular period during a day.

4. A method of claim 1, wherein characterizing the first multicast packets of the multicast flow as the baseline flow entity comprises:

receiving multicast packets of the multicast flow a plurality of times; and for each of the plurality of times, comparing attributes for the received multicast packets to a known pattern to determine whether the first multicast packets of the multicast flow are the baseline flow entity.

5. A method of claim 4, wherein the known pattern is stored in a repository.

6. A method of claim 1, further comprising:

determining a pattern of deviation from the baseline flow entity based on a comparison between the current flow entity and the baseline flow entity;

comparing the determined pattern of deviation against a set of predetermined patterns deviation;

selecting the current flow entity as new baseline flow entity if the determined pattern of deviation matches a pattern in the set of predetermined patterns of deviation; and storing the new baseline flow entity in a repository for a future comparison.

7. A method of claim 6, wherein the new baseline flow becomes an active baseline flow for a comparison with a subsequent multicast flow.

8. A method of claim 1, wherein the first multicast packets of the multicast flow are samples of the multicast flow in a multicast system.

9. A system for monitoring a multicast flow comprising:

a processor; and a memory to store machine readable instructions, which when executed by the processor cause the processor to:

receive first multicast packets of a multicast flow in a distribution tree, and determine attributes for the first multicast packets of the multicast flow;

characterize the first multicast packets of the multicast flow as a baseline flow entity based on the determined attributes for the first multicast packets of the multicast flow;

receive second multicast packets of the multicast flow in the distribution tree, determine the attributes for the second multicast packets of the multicast flow, and characterize the second multicast packets of the multicast flow as a current flow entity; and compare the attributes determined for the second multicast packets in the current flow entity against the attributes for the first multicast packets in the baseline flow entity to identify anomalies between the baseline flow entity and the current flow entity.

10. A system of claim 9, wherein the characterization of the first multicast packets of the multicast flow as the baseline flow entity is based on a time of a day.

11. A system of claim 9, wherein an alarm is generated if the differences between the baseline flow entity and the current flow entity are undesirable.

12. A system of claim 9, wherein the machine readable instructions further cause the processor to:

determine a pattern of deviation from the baseline flow entity based on a comparison between the current flow entity and the baseline flow entity;

compare the determined pattern of deviation against a set of predetermined patterns deviation;

select the current flow entity as new baseline flow entity if the determined pattern of deviation matches a pattern in the set of predetermined patterns of deviation; and store the new baseline flow entity in a repository for a future comparison.

13. A non-transitory computer readable medium including machine readable instructions executable by a processor to:

receive first multicast packets of a multicast flow in a distribution tree of a network;

determine attributes for the first multicast packets of the multicast flow;

characterize the first multicast packets of the multicast flow as a baseline flow entity based on the determined attributes for the first multicast packets of the multicast flow;

receive second multicast packets of the multicast flow in the distribution tree;

determine attributes for the second multicast packets of the multicast flow;

characterize the second multicast packets of the multicast flow as a current flow entity; and compare the attributes determined for the second multicast packets in the current flow entity against the attributes for the first multicast packets in the baseline flow entity to identify anomalies between the baseline flow entity and the current flow entity.

14. A non-transitory computer readable medium according to claim 13, wherein characterizing the first multicast packets of the multicast flow as the baseline flow entity is based on a time of a day.

15. A non-transitory computer readable medium according to claim 13, wherein to characterize the first multicast packets of the multicast flow as the baseline flow entity, the processor is to:

receive multicast packets of the multicast flow a plurality of times; and for each of the plurality of times, compare attributes for the received multicast packets to a known pattern to determine whether the first multicast packets of the multicast flow are the baseline flow entity.

16. A non-transitory computer readable medium according to claim 15, wherein the known pattern is stored in a repository.

17. A non-transitory computer readable medium according to claim 13, wherein the processor is to:

determine a pattern of deviation from the baseline flow entity based on a comparison between the current flow entity and the baseline flow entity;

compare the determined pattern of deviation against a set of predetermined patterns deviation;

select the current flow entity as new baseline flow entity if the determined pattern of deviation matches a pattern in the set of predetermined patterns of deviation; and store the new baseline flow entity in a repository for a future comparison.

\* \* \* \* \*